United States Patent
Koskinen et al.

(10) Patent No.: US 12,413,996 B2
(45) Date of Patent: Sep. 9, 2025

(54) ENHANCED EARLY MEASUREMENT REPORTING

(71) Applicant: NOKIA TECHNOLOGIES OY, Espoo (FI)

(72) Inventors: Jussi-Pekka Koskinen, Oulu (FI); Jarkko Tuomo Koskela, Oulu (FI); Samuli Heikki Turtinen, Ii (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 369 days.

(21) Appl. No.: 17/920,182

(22) PCT Filed: Apr. 21, 2020

(86) PCT No.: PCT/IB2020/053780
§ 371 (c)(1),
(2) Date: Oct. 20, 2022

(87) PCT Pub. No.: WO2021/214517
PCT Pub. Date: Oct. 28, 2021

(65) Prior Publication Data
US 2023/0189036 A1  Jun. 15, 2023

(51) Int. Cl.
*H04W 24/10* (2009.01)
(52) U.S. Cl.
CPC .................. *H04W 24/10* (2013.01)
(58) Field of Classification Search
None
See application file for complete search history.

(56) References Cited

U.S. PATENT DOCUMENTS

| | | |
|---|---|---|
| 2019/0150014 A1 | 5/2019 | Virtej et al. |
| 2019/0254110 A1 | 8/2019 | He et al. |

(Continued)

FOREIGN PATENT DOCUMENTS

| | | |
|---|---|---|
| CN | 110430594 A | 11/2019 |
| CN | 110708151 A | 1/2020 |

(Continued)

OTHER PUBLICATIONS

First Office Action dated Aug. 14, 2024, in corresponding Chinese Patent Application No. 202080101780.2, with English translation thereof.

(Continued)

*Primary Examiner* — Diane L Lo
(74) *Attorney, Agent, or Firm* — SQUIRE PATTON BOGGS (US) LLP (57) ABSTRACT

A method, apparatus, and a computer-readable storage medium are provided for enhanced early measurement reporting procedures at a user equipment. In an example implementation, the method may include a user equipment determining that the user equipment is configured for enhanced early measurement reporting, determining whether to initiate early measurement reporting measurements based on an indication when the user equipment is configured for enhanced early measurement reporting, and initiating the early measurement reporting measurements in response to determining to initiate the early measurement reporting measurements. In an additional example implementation, the method may include a network node transmitting enhanced early measurement reporting configuration to a user equipment and receiving early measurement reporting measurements from the user equipment. The early measurement reporting measurements performed at the user (Continued)

equipment based at least on the enhanced early measurement reporting configuration.

17 Claims, 6 Drawing Sheets

(56) References Cited

U.S. PATENT DOCUMENTS

| | | | |
|---|---|---|---|
| 2019/0349856 A1 | 11/2019 | Liu et al. | |
| 2021/0235300 A1* | 7/2021 | Teyeb | H04W 24/10 |
| 2021/0392537 A1* | 12/2021 | Da Silva | H04W 24/10 |
| 2022/0124532 A1* | 4/2022 | Rugeland | H04W 76/27 |
| 2022/0182893 A1* | 6/2022 | da Silva | H04W 36/0058 |

FOREIGN PATENT DOCUMENTS

| | | |
|---|---|---|
| WO | 2019197711 A1 | 10/2019 |
| WO | 2020/030501 A1 | 2/2020 |
| WO | 2020036524 A1 | 2/2020 |

OTHER PUBLICATIONS

Communication pursuant to Article 94(3) dated Jan. 23, 2025, corresponding to European Patent Application No. 20 721 802.5.
International Search Report and Written Opinion dated Jan. 27, 2021 corresponding to International Patnt Application No. PCT/IB2020/053780.
3GPP TS 38.331 V16.0.0 (Mar. 2020), Technical Specification, 3rd Generation Partnership Project; Technical Specification Group Radio Access Network; NR; Radio Resource Control (RRC) protocol specification (Release 16), Apr. 6, 2020, XP051893854.
Qualcomm Incorporated, "Supporting early measurement reporting in NR," R2-1900104, 3GPP TSG RAN WG2 Meeting #105, Athens, Greece, Feb. 25-Mar. 1, 2019, Feb. 15, 2019, XP051601504.
3GPP TS 36.331 V16.0.0 (Mar. 2020), Technical Specification, 3rd Generation Partnership Project; Technical Specification Group Radio Access Network; Evolved Universal Terrestrial Radio Access (E-UTRA); Radio Resource Control (RRC); Protocol specification (Release 16), Apr. 6, 2020, XP051893852.
Qualcomm Incorporated, "Remaining issues of signalling / configuration of early measurement reporting," R2-1903066, 3GPP TSG RAN WG2 Meeting #105bis, Xi'an, China, Apr. 8-12, 2019, Apr. 6, 2019, XP051700423.
Qualcomm Incorporated, "UE behaviours in NR early measurements," R2-1905543, 3GPP TSG RAN WG2 Meeting #106, Reno, Nevada, US, May 13-17, 2019, May 13, 2019, XP051729049.
Ericsson, "Summary of email discussion [106#37][NR/DCCA]: UE behaviour regarding idle measurement configurations and measurement results," R2-1910290, 3GPP TSG-RAN WG2#107, Prague, Czech Republic, Aug. 26-30, 2019, Aug. 15, 2019, XP051768069.
Qualcomm Incorporated, "Discussion on validity of early measurement results," R2-1908674, 3GPP TSG RAN WG2 Meeting #107, Prague, Czech, Aug. 26-30, 2019, Aug. 16, 2019, XP051766500.
Notice of Reasons for Refusal dated Sep. 28, 2023, corresponding to Japanese Patent Application No. 2022-564141.
Nokia, Nokia Shanghai Bell, Early Measurement Reporting, 3GPP TSG RAN WG4 #97-e R4-2015881, Oct. 23, 2020.
Qualcomm Incorporated, Discussion on validity of early measurement results, 3GPP TSG RAN WG2 #107 R2-1908674, Aug. 16, 2019.
Ericsson(Rapporteur), Summary of email discussion[106#37][NR/DCCA]: UE behaviour regarding idle measurement configurations and measurement results, 3GPP TSG RAN WG2#107 R2-1910290, Aug. 15, 2019.
Nokia, Nokia Shanghai Bell, Early measurements and reporting in NR, 3GPP TSG RAN WG4 #94-e R4-2001340, Feb. 14, 2020.
Result of Substantive Examination dated Aug. 29, 2024, corresponding to Vietnamese Patent Application No. 1-2022-07328, with English translation thereof.
English translation of Notice of the Result of Substantive Examination Pursuant to Article 62(3) dated Sep. 27, 2024, corresponding to Indonesian Patent Application No. P00202212972.
"3rd Generation Partnership Project; Technical Specification Group Radio Access Network; NR; Radio Resource Control (RRC) protocol specification (Release 16)", 3GPP Standard; Technical Specification; 3GPP TS 38.331, 3rd Generation Partnership Project (3GPP), Mobile Competence Centre ; 650, Route Des Lucioles ; F-06921 Sophia-Antipolis Cedex ; France vol. RAN WG2, No. V16.0.0 Apr. 6, 2020 (Apr. 6, 2020).
Qualcomm Incorporated: "Supporting early measurement reporting in NR", 3GPP Draft; R2-1900104—Supporting Early Measurement Reporting in NR, 3rd Generation Partnership Project (3GPP), Mobile Competence Centre ; 650, Route Des Lucioles; F-06921 Sophia-Antipolis Cedex; vol. RAN WG2, No. Athens, Greece; Feb. 25-Mar. 1, 2019 Feb. 15, 2019 (Feb. 15, 2019).
"3rd Generation Partnership Project; Technical Specification Group Radio Access Network; Evolved Universal Terrestrial Radio Access (E-UTRA); Radio Resource Control (RRC); Protocol specification (Release 16)", 3GPP Standard; Technical Specification; 3GPP TS 36.331, 3RD Generation Partnership Project (3GPP), Mobile Competence Centre ; 650, Route Des Lucioles ; F-06921 Sophia-Antipolis Cedex ; France vol. RAN WG2, No. V16.0.0 Apr. 6, 2020 (Apr. 6, 2020).
Office Action dated Feb. 24, 2023, corresponding to Indian Patent Application No. 202247066008.
Chinese Office Action issued in corresponding Chinese Patent Application No. 202080101780.2 on Apr. 25, 2025.
Japanese Office Action issued in corresponding Japanese Patent Application No. 2024-091300 on May 29, 2025.
Chinese Office Action issued in corresponding Chinese Patent Application No. 202080101780.2 on Jul. 2, 2025.

* cited by examiner

ENHANCED EARLY MEASUREMENT REPORTING

TECHNICAL FIELD

This description relates to wireless communications, and in particular, early measurement reporting.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

A method, apparatus, and a computer-readable storage medium are provided for enhanced early measurement reporting procedures at a user equipment. In an example implementation, the method may include a user equipment determining that the user equipment is configured for enhanced early measurement reporting, determining whether to initiate early measurement reporting measurements based on an indication when the user equipment is configured for enhanced early measurement reporting, and initiating the early measurement reporting measurements in response to determining to initiate the early measurement reporting measurements.

In an additional example implementation, the method may include a network node transmitting enhanced early measurement reporting configuration to a user equipment and receiving early measurement reporting measurements from the user equipment. The early measurement reporting measurements performed at the user equipment based at least on the enhanced early measurement reporting configuration.

DETAILED DESCRIPTION

Figure 1:
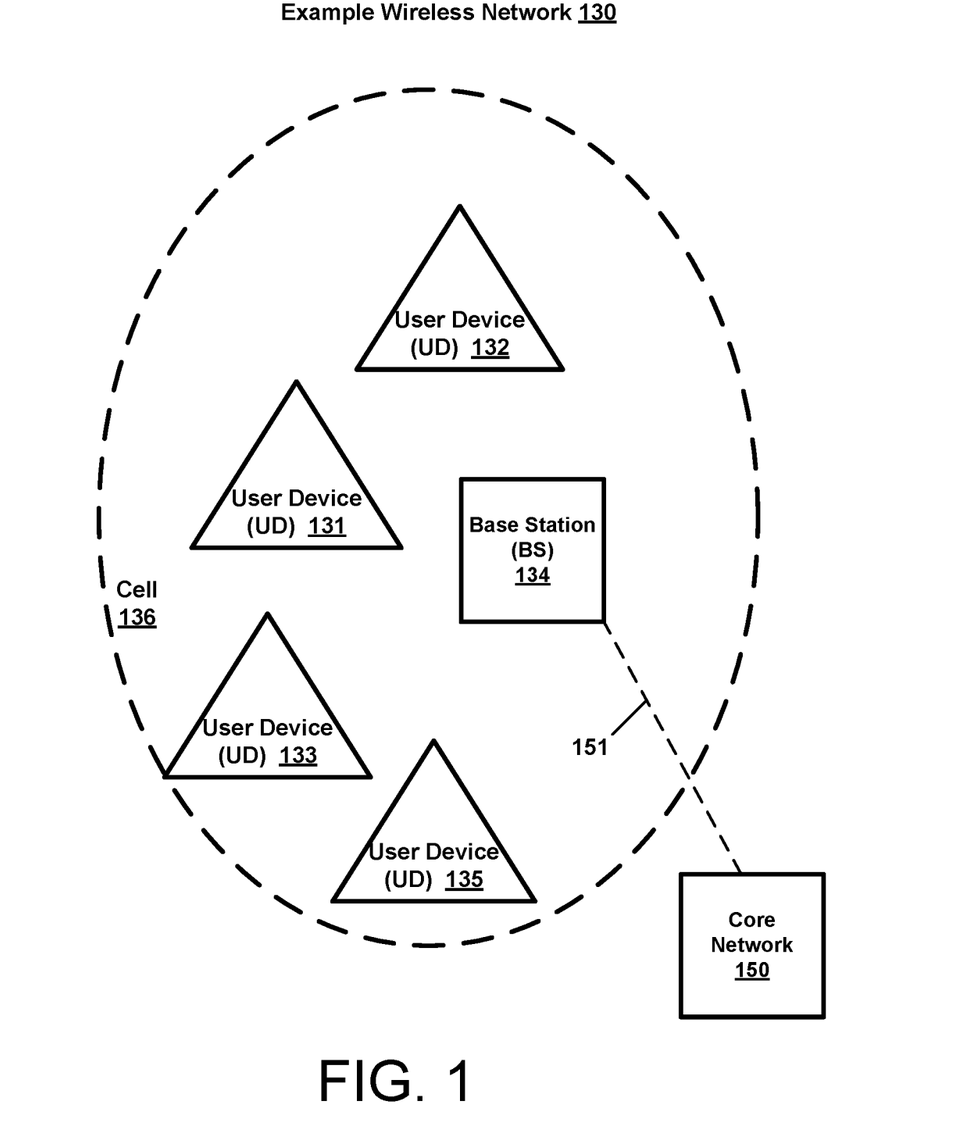
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-le-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

A user equipment (UE) may perform early measurement reporting (EMR) measurements or idle/inactive measurements as defined in TS 38.331, while a timer, e.g., a T331 timer is running. This consumes UE's battery power. It is desirable that the UE perform EMR measurements only when measurements are required. Currently, a network node, e.g., a gNB/NR, can configure a UE to perform EMR measurements only when the UE transitions from a high-power radio resource control (RRC) state (e.g., RRC_CONNECTED) to a low power RRC state (e.g., INACTIVE, IDLE, etc.) and when the T331 timer is still running which still causes unnecessary power consumption.

In some implementations, the T331 timer may be started upon receiving a radio resource control release message (e.g., RRCRelease message with measIdleDuration) from the network node. When the T331 timer is running, the UE may perform measurements (for example, according to an early measurement reporting configuration, e.g., VarMeasIdleConfig). The T331 timer may be stopped upon receiving RRCSetup, RRCResume, or RRCRelease message with idle/inactive measurement configuration, upon reselecting to cell that does not belong to the validity area (if configured), or upon cell re-selection to another radio access technology (RAT). When the T331 timer expires (or stopped), the UE may release the early measurement reporting configuration (e.g., VarMeasIdleConfig).

For example, in wireless networks, a network node (e.g., gNB/eNB) may request a UE to measure New Radio (NR) and/or Evolved-Universal Terrestrial Radio Access (E-UTRA) carriers in INACTIVE/IDLE states via system information (SI) or dedicated measurement configuration in an RRC Release message. If the UE is configured to perform measurements of NR/E-UTRA carriers while in an IDLE state, it may provide an indication of the availability of corresponding measurement results to the network in an RRCSetupComplete message. The network may request the UE to report the measurements after security activation. The request for the measurements may be sent by the network immediately after transmitting the Security Mode Command (e.g., before the reception of the Security Mode Complete from the UE). However, if the UE is configured to perform measurements of NR/E-UTRA carriers while the UE is in an INACTIVE state, the network may request the UE to provide corresponding measurement results in an RRCResume message and then the UE may include the available measurement results in an RRCResumeComplete message. Alternatively, the UE may provide an indication of the availability of the measurement results to the network in the RRCResumeComplete message and the network may then request the UE to provide these measurement results.

When a UE in RRC_CONNECTED state transitions to RRC_INACTIVE or RRC_IDLE state, the UE may collect early measurement reporting measurements when the US is in INACTIVE/IDLE state and when the T331 timer is running and report the measurements to the network once the UE transitions to RRC_CONNECTED mode. Therefore, there is a desire and/or need to collect EMR measurements and report the EMR measurements.

The present disclosure describes an example enhanced early measurement reporting (EMR) procedure. The eEMR procedure in an example implementation may include determining that a user equipment is configured for eEMR and determining whether to initiate early measurement reporting measurements based on an indication in response to determining that the user equipment is configured for enhanced early measurement reporting. The eEMR procedure may further include initiating the EMR measurements in response to determining to initiate the eEMR measurements.

Figure 2:
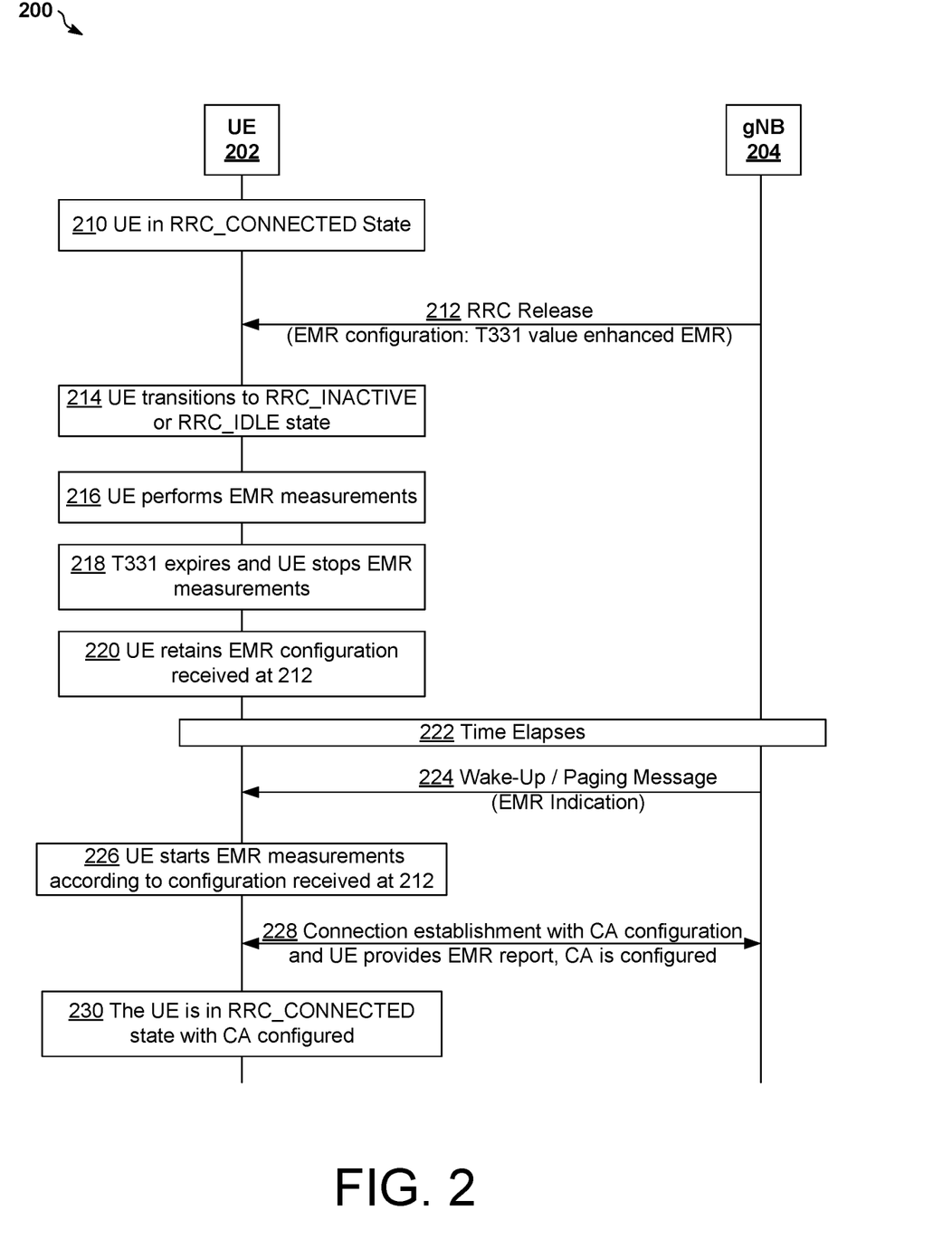
FIG. 2 illustrates an enhanced early measurement reporting (EMR) procedure, according to an example implementation.

FIG. 2 illustrates an enhanced early measurement reporting (eEMR) procedure 200, according to an example implementation.

At 210, a UE, e.g., UE 202 may be in an RRC_CONNECTED state and may be in communication with a network node, e.g., gNB/gNB 204.

At 212, UE 202 may receive an RRC release message from gNB 204. In an example implementation, the RRC release message may be sent (or transmitted) by the gNB to the UE to command the release or suspension of the RRC connection (e.g., with suspendConfig which may indicate configuration for RRC_INACTIVE state) when the UE is in an RRC_CONNECTED state. In an example implementation, the RRC release message may command the release of the RRC connection so that the UE may transition to an RRC_IDLE state. In another example implementation, the RRC release message may command suspension of the RRC connection so that the UE may transition to RRC_INACTIVE state.

In some implementations, the RRC release message may include several information elements (IEs) or parameters. In an example implementation RRC release message may include system information (SI), EMR configuration, eEMR configuration, T331 timer value, etc. In an example implementation, the eEMR configuration may include an indication to the UE to save (or retain) the EMR configuration, that is received at 212, upon expiration of the T331 timer. In an example implementation, the RRC release message may contain information, e.g., a MeasIdleConfig Information Element (IE), for EMR measurements. The MeasIdleConfig IE may be used to convey information to the UE about measurements to be performed while the UE is in RRC_IDLE or RRC-INACTVE state.

At 214, upon receiving of the RRC release message from the gNB, UE 202 may transition UE 202 to RRC_IDLE or RRC_INACTIVE state, for example, to conserve UE power/battery and/or network resources.

Upon transitioning of the UE to RRC_IDLE or RRC_INACTIVE state, at 216, UE 202 may perform EMR measurements, as defined in TS 38.331. For example, 5.7.8 of TS 38.331 describes a procedure that specifies the measurements done by a UE in RRC_IDLE and RRC_INACTIVE states when the UE has an idle/inactive measurement configuration and the storage of the available measurements by a UE in RRC_IDLE and RRC_INACTIVE state. In some implementations, for example, UE 202 may perform EMR measurements when T331 timer is running (e.g., T331 timer not expired). The UE may perform the EMR measurements based at least on the EMR configuration received from gNB 204 at 212 (e.g., via an RRC message or SIB11).

At 218, upon expiration of the T331 timer, UE 202 may stop the EMR measurements. In other words, the UE may perform EMR measurements based at least on the EMR configuration and stop performing (e.g., measuring, collecting, etc.) the EMR measurements once T331 timer expires.

Upon expiration of T331 timer, at 220, UE 202 may save the EMR configuration received at 212. As the UE may delete the EMR configuration received from the gNB once T331 timer expires, in some implementations, for example, UE 202 may save the EMR configuration received at 212 if the UE is configured with eEMR configuration. This allows for the UE to perform EMR measurements based at least on the EMR configuration even after the expiration of T331 timer. In some implementations, for example, UE 202 may save the EMR configuration if the UE is configured for eEMR.

In some implementations, the UE may decide to save the EMR configuration upon expiration of T331 timer if the UE is configured with eEMR configuration or supports eEMR.

Upon some time has elapsed at 222, UE 202, at 224, may receive a wake-up signal/indication or paging message from gNB 204. In some implementations, the UE may receive a wake-up signal/indication to wake up for receiving a paging message. In some implementations, for example, the wake-up signal/indication or paging message may include an indication to initiate EMR measurements at the UE and/or report the EMR measurements to the gNB. In some implementations, for example, the wake-up signal (WUS) may allow a UE to skip physical downlink control channel (PDCCH) monitoring for paging reception when in IDLE/INACTIVE state (or mode) or for OnDurations when there is no data transmission to be done in CONNECTED mode. If a network node intends to send a paging message to the UE or to schedule the UE, the network node may send wake up signalling to the UE during WUS occasion(s) to wake up the UE and the UE will then monitor the normal PDCCH for paging reception or scheduling data at the coming OnDuration. The WUS may be referred to as downlink control information (DCI) with cyclic redundancy check (CRC) scrambled by power saving radio network temporary identity (PS-RNTI), DCP, in third generation partnership project (3GPP). The WUS may be a reference signal or a sequence received/decoded by the UE. The WUS may be a special downlink control information (DCI) format which may wake-up individual UEs, group of UEs, or all UEs decoding the WUS.

At 226, in response to the receiving of the wake-up signal/indication or paging message, UE 202 may start or initiate EMR measurements. In some implementations, for example, UE 202 may start EMR measurements based at least on the EMR configuration received at 212. In some implementations, for example, the wake-up signal/indication or paging message may further indicate to the UE to perform EMR measurements. In addition, in some implementations, for example, the wake-up signal/indication or paging message may also indicate to the UE to report the EMR measurements to the gNB. In an example implementation, the UE may report the EMR measurements to the gNB when the UE transitions to RRC_CONNECTED state.

At 228, UE 202 may perform connection establishment with the gNB and the gNB may configure carrier aggregation (CA) or dual connectivity (DC) configuration, transmit the EMR measurements (e.g., EMR report or EMR results) to the gNB.

At 230, UE 202 may transition to RRC_CONNECTED state once the connection is established. In some implementations, for example, the UE may be configured with CA or DC. For example, if the UE provides EMR results that are good enough for CA or DC, the gNB may configure CA or DC for the UE. In an example implementation if the reported RSRP is good enough for cells a, b, and c, then the gNB may configure CA or DC with cells a, b, and/or c.

Thus, the UE after transitioning to an RRC_IDLE or RRC_INACTIVE state may perform EMR measurements upon the expiration of T331 timer in response to a wake-up signal/indication or paging message. The UE may perform the EMR measurements and collect measurement results after the expiration of T331 timer based at least on the EMR configuration saved by the UE. The UE may save the EMR configuration in response to receiving eEMR configuration from the gNB. In other words, the UE may save the EMR configuration although the T331 timer has expired. In some implementations, the UE may save the EMR configuration if the UE is configured for eEMR configuration or the UE supports eEMR configuration, for example, based on the 3GPP Specifications.

Figure 3:
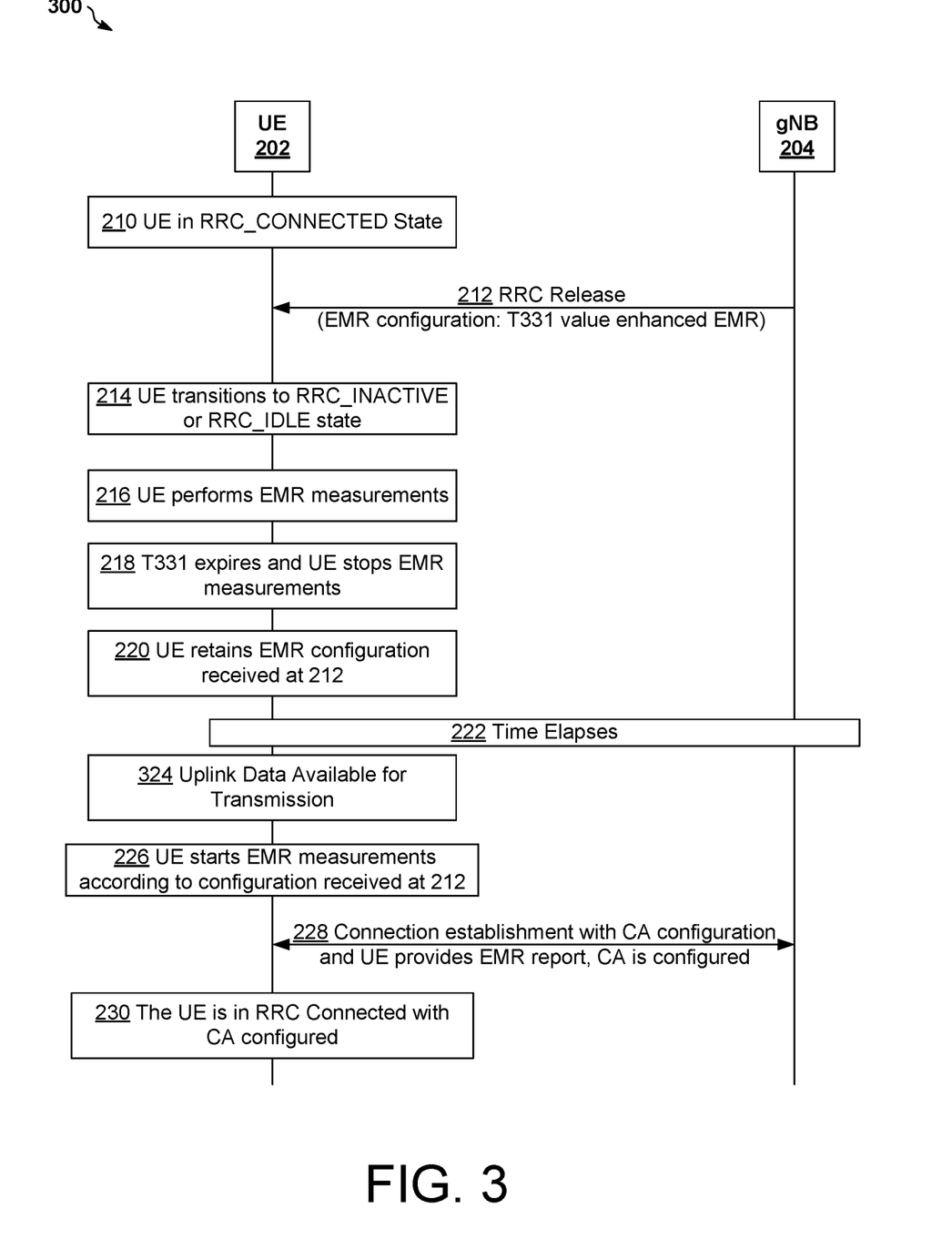
FIG. 3 illustrates another enhanced early measurement reporting (EMR) procedure, according to an additional example implementation.

FIG. 3 illustrates another enhanced early measurement reporting (EMR) procedure 300, according to an additional example implementation.

In some implementations, for example, the operations at 210-222 and 226-230 illustrated in FIG. 3 may be same or similar to operations 210-222 and 226-230 illustrated in FIG. 2.

At 324, UE 202 may detect the availability (presence) of uplink data in a buffer at the UE for transmission to gNB 204. In response to the detection of the availability of uplink data for transmission, UE 202 may start EMR measurements and collect measurement results as described earlier in reference to 226 of FIG. 2.

Thus, the UE after transitioning to an RRC_IDLE or RRC_INACTIVE state may perform EMR measurements upon/after the expiration of T331 timer in response to detecting the availability of uplink data for transmission to the gNB. The UE may perform the EMR measurements after the expiration of T331 timer based at least on the EMR configuration saved by the UE as described earlier in reference to FIG. 2.

Figure 4:
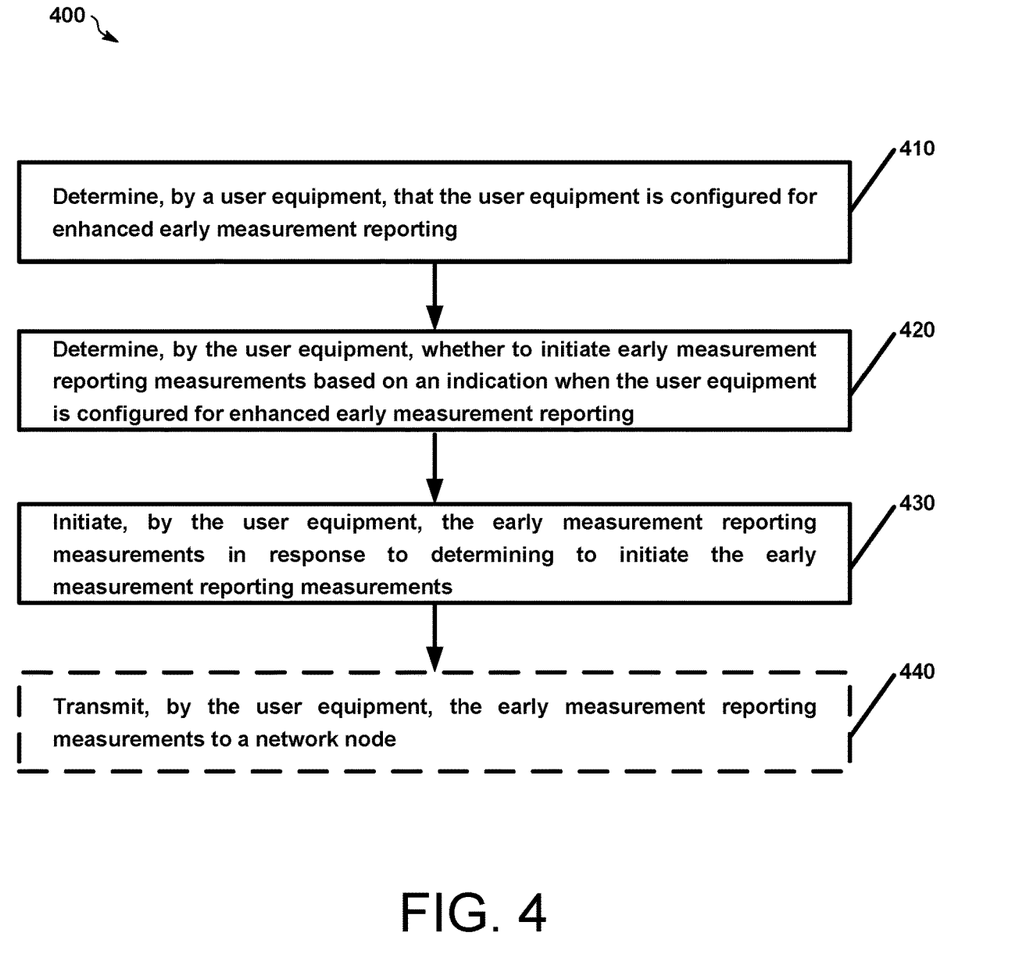
FIG. 4 is a flow chart illustrating an enhanced early measurement reporting (EMR) procedure, according to an example implementation.

FIG. 4 is a flow chart 400 illustrating enhanced early measurement reporting (EMR) procedure, according to an example implementation.

At block 410, a UE, e.g., UE 202, may determine that the user equipment is configured for enhanced early measurement reporting.

In some implementations, for example, the UE may be configured for eEMR configuration based at on an RRC message received from the gNB. In an additional example implementation, the RRC message may be an RRC release message or a SIB. In another additional example implementation, the UE may determine that the UE is configured for eEMR based on whether the UE supports eEMR.

At block 420, the UE may determine whether to initiate early measurement reporting measurements based on an indication when the user equipment is configured for enhanced early measurement reporting. In some implementations, for example, when the UE is configured for enhanced early measurements reporting, the UE may initiate EMR measurements in response to receiving an indication, e.g., a wake-up signal/indication or paging message from the gNB. In an additional example implementation, the UE may initiate EMR measurements and collect measurement results in response to an indication which may be availability of uplink data in a buffer at the UE for transmission to the gNB. In an additional example implementation, the wake-up signal/indication or paging message may also indicate to the UE to report the EMR measurements to the gNB.

At block 430, the UE may initiate the early measurement reporting measurements and collect the measurement results. In an example implementation, the UE may initiate the EMR in response to determining the EMR measurements are to be initiated. In an example implementation, the UE may initiate EMR measurements before, during, and/or after connection establishment, connection resume, and/or random procedures.

Optionally, in some implementations, for example, at block 440, the UE may transmit the EMR measurements to the gNB.

Thus, the UE after transitioning to an RRC_IDLE or RRC_INACTIVE state may perform EMR measurements upon/after the expiration of T331 timer and may report the measurements to the gNB.

Figure 5:
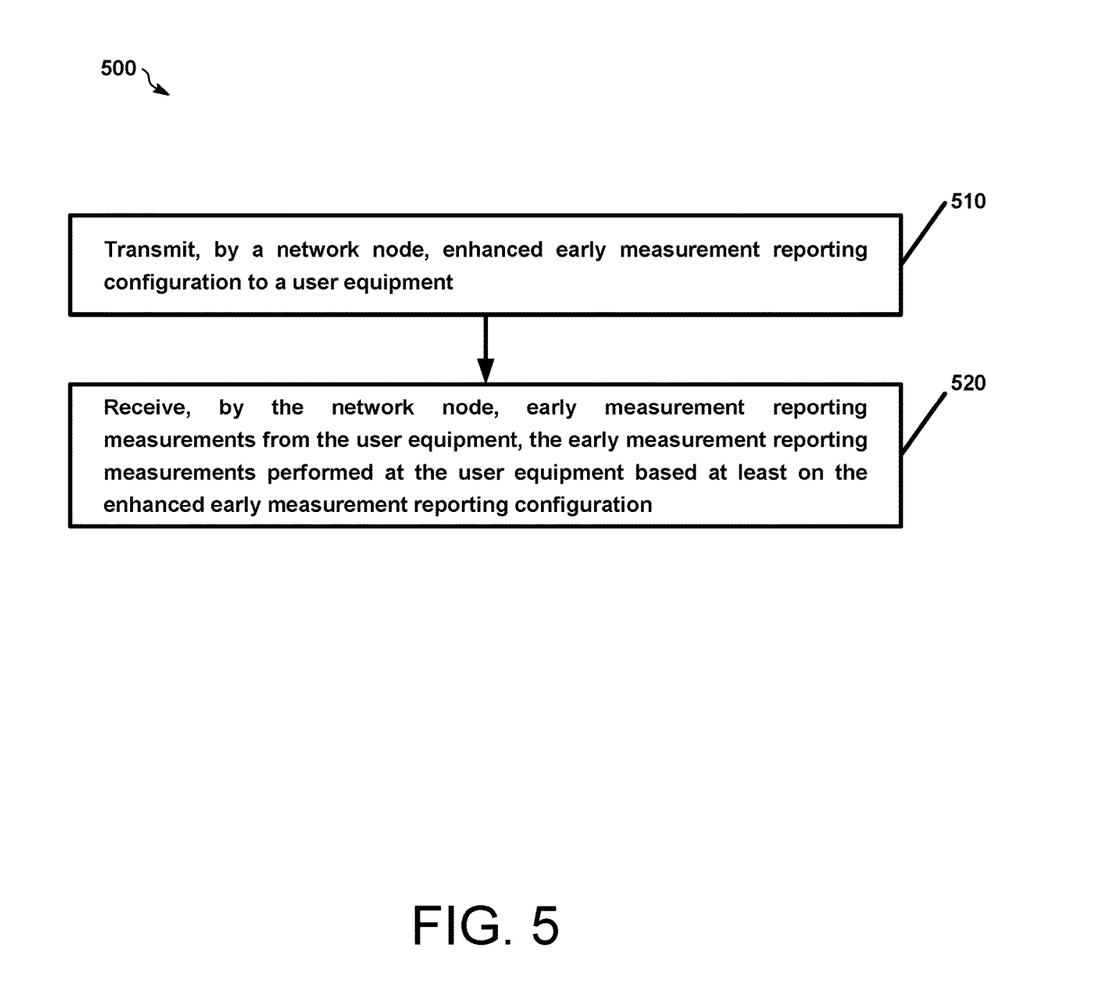
FIG. 5 is a flow chart illustrating another enhanced early measurement reporting (EMR) procedure, according to an example implementation.

FIG. 5 is a flow chart 500 illustrating enhanced early measurement reporting (EMR) procedure, according to an example implementation.

At block 510, a network node, e.g., gNB 204, may transmit enhanced early measurement reporting configuration to a user equipment, e.g., UE 202.

At block 520, the network node may receive early measurement reporting measurements. In some implementations, for example, the early measurement reporting measurements may be collected at the UE based at least on the early measurement reporting configuration sent by the gNB.

Thus, the gNB may receive early measurement reporting measurements based at least on the enhanced early measurement reporting configuration sent to the user equipment.

Additional example implementations are described herein.

Example 1. A method of communications, comprising: determining, by a user equipment, that the user equipment is configured for enhanced early measurement reporting; determining, by the user equipment, whether to initiate early measurement reporting measurements based on an indication when the user equipment is configured for enhanced early measurement reporting; and initiating, by the user equipment, the early measurement reporting measurements in response to determining to initiate the early measurement reporting measurements.

Example 2. The method of Example 1, wherein the indication includes: a wake-up signal/indication or paging message received by the user equipment from the network node; or uplink data becomes available for transmission at the user equipment.

Example 3. The method of any of Examples 1-2, further comprising: transmitting the early measurement reporting measurements to a network node.

Example 4. The method of any of Examples 1-2, further comprising: sending a message to the network node indicating availability of the early measurement reporting measurements; receiving a request from the network node to send the available early measurement reporting measurements; and transmitting the early measurement reporting measurements to the network node.

Example 5. The method of any of Examples 1-4, wherein the wake-up signal/indication or paging message further indicates to the user equipment to perform the initiating and/or the transmitting of the early measurement reporting measurements to the network node.

Example 6. The method of any of Examples 1-5, wherein the early measurement reporting measurements are idle/inactive measurements.

Example 7. The method of any of Examples 1-6, wherein the user equipment is configured for enhanced early measurement reporting based at least on a radio resource control message from the network node.

Example 8. The method of any of Examples 1-7, wherein the radio resource control message is a radio resource control release message.

Example 9. The method of any of Examples 1-8, wherein the user equipment is configured for enhanced early measurement reporting based on whether the user equipment supports enhanced early measurement reporting.

Example 10. The method of any of Examples 1-9, further comprising: receiving by the user equipment early measuring reporting configuration from the network node; and saving the early measurement reporting configuration received by the user equipment from the network node upon expiration of a T331 timer in response to determining that the user equipment is configured for enhanced early measurement reporting.

Example 11. The method of any of Examples 1-10, wherein the user equipment initiates, collects, or measures early measurement reporting measurements before, during, and/or after one or more of: connection establishment, connection resume, and random access procedures.

Example 12. The method of any of Examples 1-11, further comprising: terminating early measurement reporting measurements upon reporting of the early measurement reporting measurements to the network node.

Example 13. The method of any of Examples 1-12, wherein the network node is a gNB.

Example 14. A method of communications, comprising: transmitting, by a network node, enhanced early measurement reporting configuration to a user equipment; and receiving, by the network node, early measurement reporting measurements from the user equipment, the early measurement reporting measurements performed at the user equipment based at least on the enhanced early measurement reporting configuration.

Example 15. The method of Example 14, further comprising: transmitting enhanced early measurement reporting configuration to a user equipment, wherein the receiving of the early measurement reporting measurements from the user equipment is based at least on the enhanced early measurement reporting configuration and the early measurement reporting configuration.

Example 16. The method of any of Examples 14-15, further comprising: transmitting a wake-up signal/indication or paging message to the user equipment.

Example 17. The method of any of Examples 14-16, wherein the wake-up signal/indication or paging message includes an indication to initiate early measurement reporting measurements.

Example 18. The method of any of Examples 14-17, wherein the network node is a gNB.

Example 19. An apparatus comprising means for performing the method of any of Examples 1-18.

Example 20. A non-transitory computer-readable storage medium comprising instructions stored thereon that, when executed by at least one processor, are configured to cause a computing system to perform the method of any of Examples 1-18.

Example 21. An apparatus comprising: at least one processor; and at least one memory including computer program code; the at least one memory and the computer program code configured to, with the at least one processor, cause the apparatus at least to perform the method of any of Examples 1-18.

Figure 6:
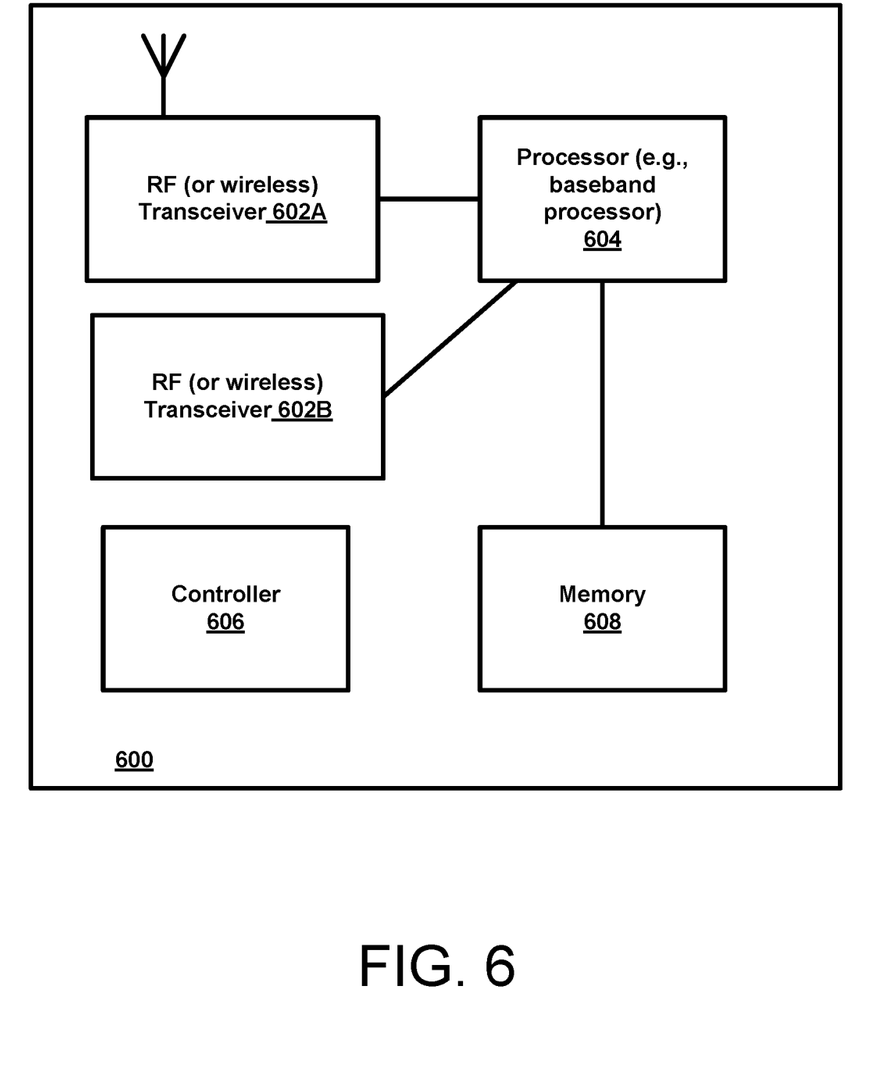
FIG. 6 is a block diagram of a node or wireless station (e.g., base station/access point or mobile station/user device/UE), according to an example implementation.

FIG. 6 is a block diagram of a wireless station (e.g., user equipment (UE)/user device or AP/gNB/MgNB/SgNB) 600 according to an example implementation. The wireless station 600 may include, for example, one or more RF (radio frequency) or wireless transceivers 602A, 602B, where each wireless transceiver includes a transmitter to transmit signals and a receiver to receive signals. The wireless station also includes a processor or control unit/entity (controller) 604/608 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602 (602A or 602B). Processor 604 may control transmission of signals or messages over a wireless network, and may control the reception of signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6, such as controlling input/output devices (e.g., display, keypad), and/or may execute software for one or more applications that may be provided on wireless station 600, such as, for example, an email program, audio/video applications, a word processor, a Voice over IP application, or other application or software. Moreover, a storage medium may be provided that includes stored instructions, which when executed by a controller or processor may result in the processor 604, or other controller or processor, performing one or more of the functions or tasks described above.

According to another example implementation, RF or wireless transceiver(s) 602A/602B may receive signals or data and/or transmit or send signals or data. Processor 604 (and possibly transceivers 602A/602B) may control the RF or wireless transceiver 602A or 602B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communications, comprising:
   determining, by a user equipment, that the user equipment is configured for enhanced early measurement reporting, the determining being based on a radio resource control message received from a network node, the radio resource control message comprising a first indication to the user equipment to save an enhanced early measurement reporting configuration;
   determining, by the user equipment, whether to initiate early measurement reporting measurements based on a second indication when the user equipment is configured for the enhanced early measurement reporting; and
   initiating, by the user equipment, the early measurement reporting measurements in response to determining to initiate the early measurement reporting measurements,
   wherein the second indication comprises
      a wake-up signal/indication received by the user equipment from the network node, or
      uplink data available for transmission at the user equipment.

2. The method of claim 1, further comprising:
   transmitting the early measurement reporting measurements to a network node.

3. The method of claim 1, further comprising:
   sending a message to the network node indicating availability of the early measurement reporting measurements;
   receiving a request from the network node to send the available early measurement reporting measurements; and
   transmitting the early measurement reporting measurements to the network node.

4. The method of claim 1, wherein the wake-up signal/indication or paging message further indicates to the user equipment to perform the initiating and/or the transmitting of the early measurement reporting measurements to the network node.

5. The method of claim 1, wherein the early measurement reporting measurements are idle/inactive measurements.

6. The method of claim 1, wherein the radio resource control message is a radio resource control release message.

7. The method of claim 1, wherein the user equipment is configured for enhanced early measurement reporting based on whether the user equipment supports enhanced early measurement reporting.

8. The method of claim 1, further comprising:
   receiving by the user equipment, the enhanced early measuring reporting configuration from the network node; and
   saving the enhanced early measurement reporting configuration received by the user equipment from the network node upon expiration of a T331 timer in response to determining that the user equipment is configured for enhanced early measurement reporting.

9. The method of claim 1, wherein the user equipment initiates, collects, or measures early measurement reporting measurements before, during, and/or after one or more of: connection establishment, connection resume, and random access procedures.

10. The method of claim 2, further comprising:
    terminating early measurement reporting measurements upon reporting of the early measurement reporting measurements to the network node.

11. The method of claim 1, wherein the network node is a gNB.

12. A non-transitory computer-readable storage medium comprising instructions stored thereon that, when executed by at least one processor, are configured to cause a computing system to perform steps, comprising:
    determining, by a user equipment, that the user equipment is configured for enhanced early measurement reporting, the determining being based on a radio resource control message received from a network node, the radio resource control message comprising a first indication to the user equipment to save an enhanced early measurement reporting configuration;
    determining, by the user equipment, whether to initiate early measurement reporting measurements based on a second indication when the user equipment is configured for the enhanced early measurement reporting; and
    initiating, by the user equipment, the early measurement reporting measurements in response to determining to initiate the early measurement reporting measurements,
    wherein the second indication comprises
       a wake-up signal/indication received by the user equipment from the network node, or
       uplink data available for transmission at the user equipment.

13. An apparatus comprising:
    at least one processor; and
    at least one memory including computer program code;
    the at least one memory and the computer program code configured to, with the at least one processor, cause the apparatus at least to:
    determine, that the apparatus is configured for enhanced early measurement reporting, the determining being based on a radio resource control message received from a network node, the radio resource control message comprising a first indication to the apparatus to save an enhanced early measurement reporting configuration;
    determine, whether to initiate early measurement reporting measurements based on a second indication when the apparatus is configured for the enhanced early measurement reporting; and
    initiate, the early measurement reporting measurements in response to determining to initiate the early measurement reporting measurements,
    wherein the second indication comprises
       a wake-up signal/indication received by the apparatus from the network node, or
       uplink data available for transmission at the apparatus.

14. A method of communications, comprising:
    transmitting, by a network node, enhanced early measurement reporting configuration to a user equipment, the enhanced early measurement reporting configuration comprising an indication to the user equipment to save the enhanced early measurement reporting configuration;
    transmitting a wake-up signal/indication to the user equipment, or causing the user equipment to detect uplink data available for transmission at the user equipment; and
    receiving, by the network node, early measurement reporting measurements from the user equipment, the early measurement reporting measurements performed at the user equipment are based at least on the enhanced early measurement reporting configuration.

15. The method of claim 14, further comprising:
    transmitting enhanced early measurement reporting configuration to a user equipment, wherein the receiving of the early measurement reporting measurements from the user equipment is based at least on the enhanced early measurement reporting configuration.

16. The method of claim 14, wherein the wake-up signal/indication or paging message includes an indication to initiate the early measurement reporting measurements.

17. The method of claim 14, wherein the network node is a gNB.

* * * * *